(12) United States Patent
Olsson et al.

(10) Patent No.: US 11,062,861 B2
(45) Date of Patent: Jul. 13, 2021

(54) SAFETY SWITCH INCLUDING MAIN BUTTON AND SUB BUTTON ARRANGEMENTS

(71) Applicant: Globe (Jiangsu) Co., Ltd., Jiangsu (CN)

(72) Inventors: Johanna Olsson, Joenkoeping (SE); Zhigao Pu, Jiangsu (CN)

(73) Assignee: Globe (Jiangsu) Co., Ltd., Jiangsu (CN)

( * ) Notice: Subject to any disclaimer, the term of this patent is extended or adjusted under 35 U.S.C. 154(b) by 0 days.

(21) Appl. No.: 16/499,486

(22) PCT Filed: Mar. 14, 2018

(86) PCT No.: PCT/CN2018/078919
§ 371 (c)(1),
(2) Date: Sep. 30, 2019

(87) PCT Pub. No.: WO2019/173980
PCT Pub. Date: Sep. 19, 2019

(65) Prior Publication Data
US 2020/0043684 A1    Feb. 6, 2020

(51) Int. Cl.
*H01H 25/00*   (2006.01)
*A01D 34/00*   (2006.01)
*A01D 101/00*  (2006.01)

(52) U.S. Cl.
CPC ......... *H01H 25/006* (2013.01); *A01D 34/001* (2013.01); *A01D 34/008* (2013.01);
(Continued)

(58) Field of Classification Search
CPC .... H01H 3/20; H01H 25/006; H01H 2239/03; H01H 2221/082; H01H 2300/024; B25F 5/00
See application file for complete search history.

(56) References Cited

U.S. PATENT DOCUMENTS 4,006,334 A * 2/1977 Robotham ............... H01H 3/20
                                                     200/43.17
6,577,221 B1   6/2003 Wang
(Continued)

FOREIGN PATENT DOCUMENTS

CN   101916675 A   12/2010
CN   201773738 U   3/2011
(Continued)

OTHER PUBLICATIONS

Search Report and Written Opinion in related International Patent Application No. PCT/US2018/078919 dated Dec. 19, 2018; 9 pages.

(Continued)

*Primary Examiner* — Vanessa Girardi
(74) *Attorney, Agent, or Firm* — Rooney IP, LLC

(57) ABSTRACT

Safety switch for a gardening device driven by a motor. The safety switch includes a main button arrangement and a sub button arrangement which is provided onto the main button arrangement. The main button arrangement may pivot between a first position and a second position. In the first position the sub button arrangement may be provided in an arrest position and in the second position the sub button arrangement is arranged in an energize position. Further, the sub button arrangement includes biasing means by means of which biasing means the sub button arrangement is biased towards the arrest position in the first position, and by application of an external force the sub button arrangement may be moved towards a biasing force exerted by the biasing means and be slid to the energize position where the main button arrangement may activate the power means in the second position.

5 Claims, 3 Drawing Sheets

(52) U.S. Cl.
CPC ... *A01D 2101/00* (2013.01); *H01H 2221/082* (2013.01); *H01H 2239/03* (2013.01); *H01H 2300/024* (2013.01)

(56) References Cited

U.S. PATENT DOCUMENTS

| | | |
|---|---|---|
| 7,525,054 B2 | 4/2009 | Ng et al. |
| 2005/0205406 A1 | 9/2005 | Wong |

FOREIGN PATENT DOCUMENTS

| | | |
|---|---|---|
| CN | 201898047 U | 7/2011 |
| CN | 204167173 U | 2/2015 |
| CN | 107711081 A | 2/2018 |
| DE | 1947014 A | 3/1971 |
| DE | 2450577 A | 5/1976 |
| JP | 2012248309 A | 12/2012 |

OTHER PUBLICATIONS

European Search Report and Search Opinion in related European Patent Application No. 18909671.2 dated Feb. 26, 2020; 7 pages.

* cited by examiner

A - A

B - B

SAFETY SWITCH INCLUDING MAIN BUTTON AND SUB BUTTON ARRANGEMENTS

TECHNICAL FIELD

The present invention relates generally to a safety switch for a gardening device and a method for energizing a motor of a gardening device.

BACKGROUND ART

In the prior art are known a large number of safety switches used for starting a gardening device, such as for example a robotic lawnmower. The safety switches may prevent unintentional starting of the robotic lawnmower and reduce the risk that the hands and feet of any living creature are injured by the rotating blades during operation. Robotic lawn mowers are equipped with a power switch which may have the function of a safety button. The safety button is either electronic or mechanical or a combination of both.

Due to new upcoming legal requirements, it will not be allowed to use a start switch with only one single action to start a robotic mower. According to the legal requirements the start procedure needs to employ at least two different actions which are sequentially performed.

In the prior art the dual action requirement has been solved by means of an electronic start button, which is designed as a display with a plurality of buttons. Before the operator may change the settings for the lawnmower by pressing the buttons on the display, a personal PIN-code needs to be entered. By entering the PIN-code and pressing the display buttons, the legal requirement of using two different sequential actions is considered to be fulfilled. Robotic lawnmowers are exposed to all types of weather conditions and operate in a dirty environment. A drawback with an electronic start button, since it may be operating in a moist environment, it may easily malfunction when moisture and dirt are squeezed into the electronic circuits and cause, e.g., short circuiting. In the case of a malfunction, the whole electronic display including cabling may need to be replaced, which is both costly and time-consuming.

SUMMARY OF INVENTION

An object of the present invention is to provide an improved safety switch, which is entirely mechanical. This to reduce the manufacturing costs and repair costs, and at the same time facilitate service when interchange of separate parts is necessary.

According to a preferred embodiment, the invention relates to a safety switch for a gardening device driven by a motor. Further, the safety switch comprises a main button arrangement and a sub button arrangement which is provided on the main button arrangement and a pivot axis around which the main button arrangement may pivot between a first position and a second position. The sub button arrangement is slidably arranged, such that in the first position the sub button arrangement is in an arrest position and in the second position the sub button arrangement is in an energize position. Further the sub button arrangement comprises biasing means by means of which biasing means the sub button arrangement is biased towards the arrest position in the first position, and by application of an external force the sub button arrangement is moveable towards a biasing force exerted by the biasing means and slidable into the energize position, in which the main button arrangement is arranged to activate the power means in the second position.

The safety switch is provided on a housing of a garden device provided with an abutment portion. The sub button arrangement is provided with a protruding sub button portion, which protrudes toward and abuts the abutment portion of the housing in the arrested position.

The sub button arrangement further comprises a first slidable button portion which is attached to a second slidable button portion which is spring biased against the main button arrangement by means of the biasing means.

The biasing means is provided on a guiding pin which is provided on the second slidable button portion and the guiding pin extends toward the pivot axis.

The sub button arrangement comprises a first and a second protrusion which extend toward the main button arrangement, and which main button arrangement comprises a first recess and a second recess into which the first and second protrusions protrude.

The first and second recesses of the main button arrangement are U-shaped and comprise, respectively, first and second, and third and fourth wall portions which extend toward the sub button arrangement.

The biasing means of the sub button arrangement is a coil spring which is provided on the guiding pin.

The motor is preferably an electric motor. Preferably, the gardening device is a robotic lawnmower or a powered lawn mower.

A method for energizing the motor of a gardening device by means of a safety switch comprises the steps:
 arranging the main button arrangement in the first position,
 applying an external force to a sub button arrangement to overcome the biasing force exerted by a biasing means,
 sliding the sub button arrangement from an arrest position to an energize position,
 pivoting the main button arrangement around a pivot axle from a first position to a second position,
 maintaining the external force on the sub button arrangement while pivoting the main button arrangement around the pivot axle to the second position, and
 energizing the motor by activation of a power means.

BRIEF DESCRIPTION OF DRAWINGS

The invention is now described, by way of example, with reference to the accompanying drawings, in which.

DESCRIPTION OF EMBODIMENTS

In the description below, various directions will be given with reference to a gardening device placed on a ground surface in a ready-to-use state, with a safety switch placed on a surface substantially parallel with the ground surface. Example of such directions can be forward, rear, up, down, sideways, etc. It should particularly be pointed out that the directions are given with reference to a safety switch mounted onto the gardening device placed on a ground surface.

In the following, a detailed description of a safety switch 1 according to the invention is disclosed in detail with reference to the accompanying drawings.

Figure 1:
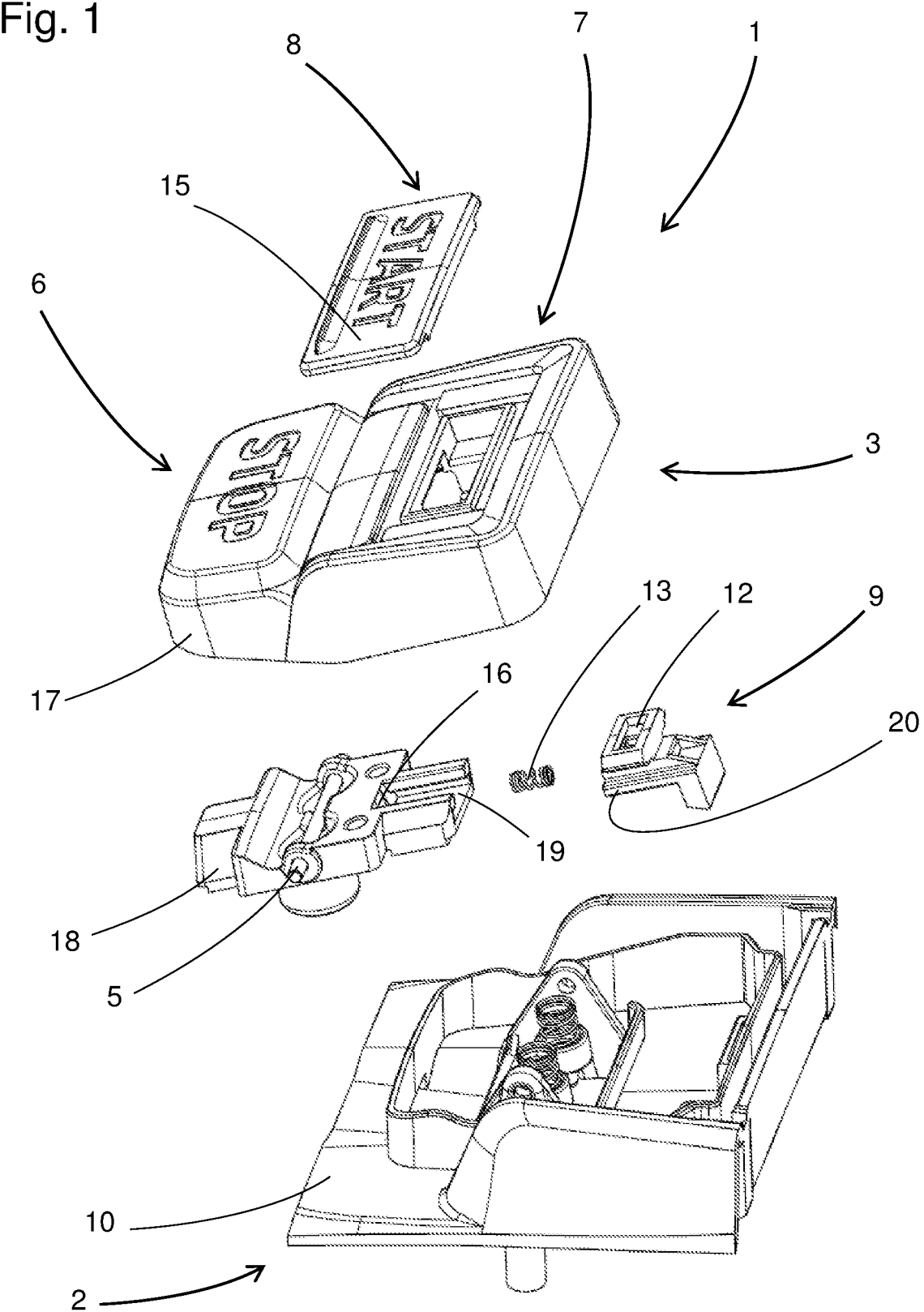
FIG. 1 is an exploded view of a safety switch in a first position according to the invention.
Figure 2:
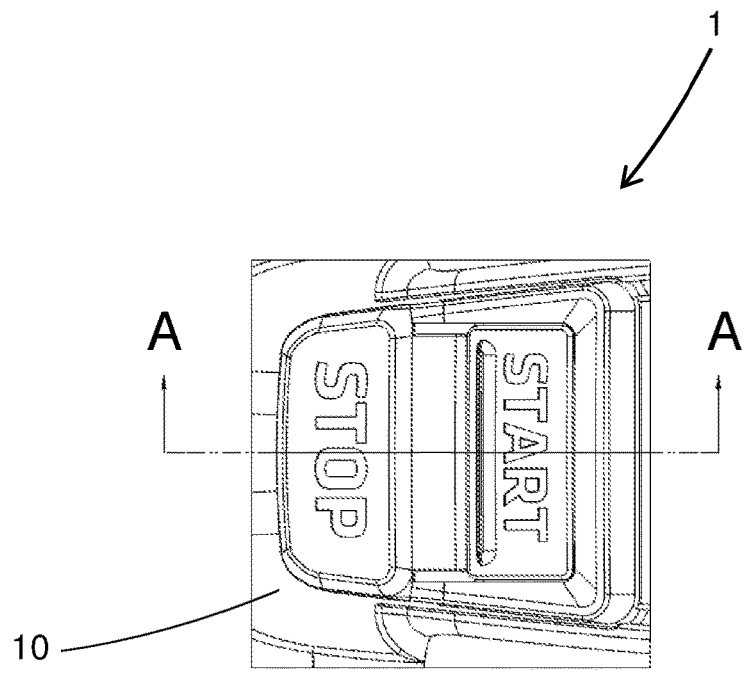
FIG. 2 is a top view of the safety switch according to FIG. 1.
Figure 3:
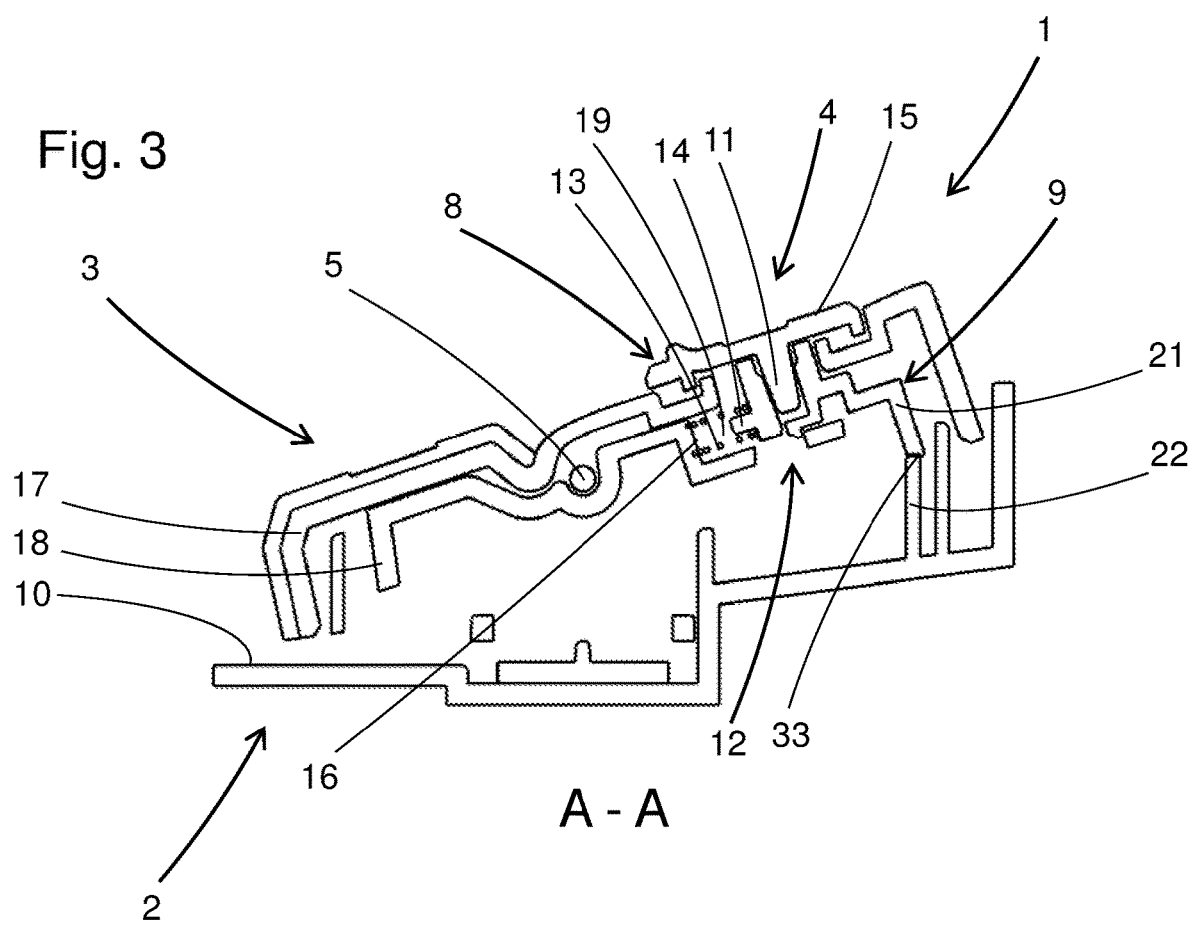
FIG. 3 is a section view along line A-A in FIG. 2.
Figure 4:
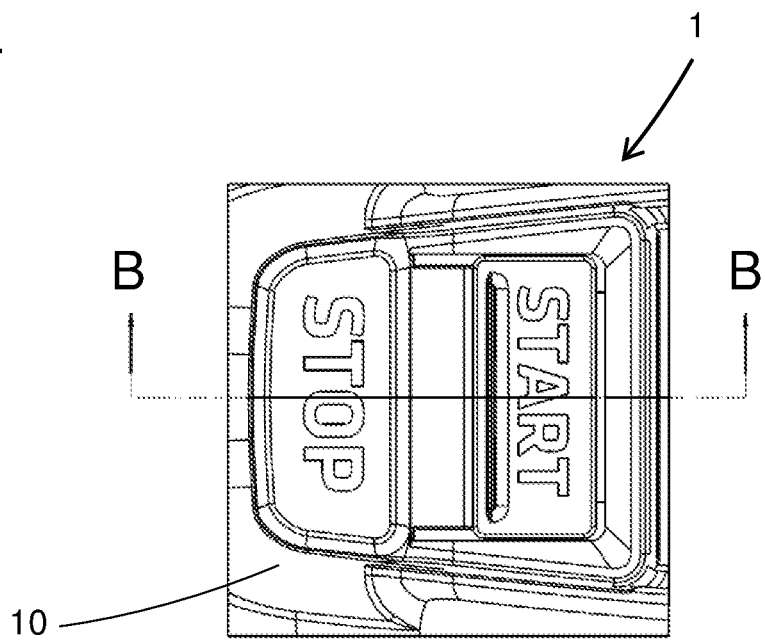
FIG. 4 is a top view of the safety switch in a second position.
Figure 5:
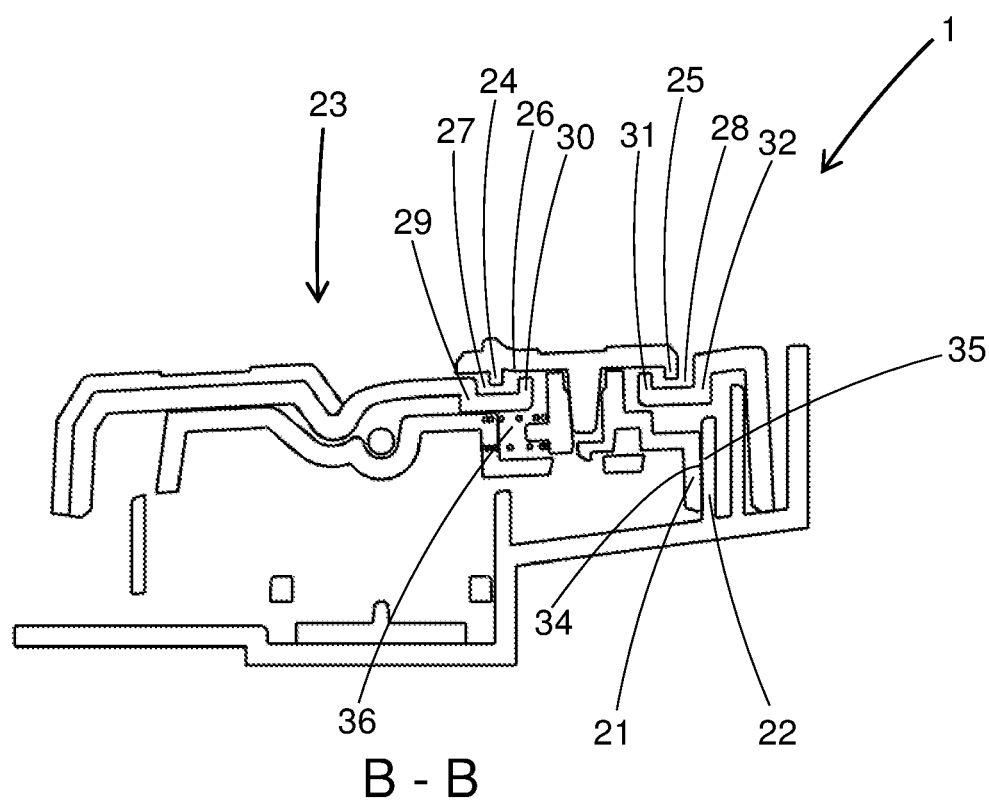
FIG. 5 is a section view along line B-B in FIG. 4.

FIGS. 1-3 show a safety switch 1 assembled onto a housing 2 or chassis of a gardening device. The gardening device may be a robotic lawnmower or any other gardening device onto which the safety switch may be applied. The gardening device is driven by a motor or engine (not shown). The motor or engine is preferably an electric motor. FIGS. 1-3 show the safety switch 1 in a first position in which the safety switch 1 is in an arrest position. Further, FIGS. 4-5 show the safety switch 1 pivoted to a second position, in which the safety switch 1 is in an energize position.

FIG. 1 shows the safety switch in an exploded view in a first position according to the invention. The safety switch 1 is used to activate a power means (not shown) for energizing the motor. The safety switch 1 is provided on the housing 2. The safety switch comprises a main button arrangement 3 and a sub button arrangement 4 which is provided on the main button arrangement 3.

The main button arrangement 3 is disposed on a pivot axle 5 which is attached to the housing 2. The main button arrangement 3 may pivot around the pivot axle 5 between the first position and the second position, which are the end positions of the pivot motion of the main button arrangement 3. The main button arrangement 3 comprises a first portion 6 and a second portion 7, each placed on either side of the pivot axle 5. The sub button arrangement 4 is provided on the second portion 7.

The sub button arrangement 4 comprises a first slidable button portion 8 and second slidable button portion 9. The first slidable button portion 8 is arranged above the second slidable button portion 9, in the event the safety switch 1 is provided and oriented onto an upper essentially horizontal surface 10 of the housing 2. The first slidable button portion 8 is provided with a protrusion 11 extending toward the second slidable button portion 9. The first slidable button portion 8 and the second slidable button portion 9 are preferably separate parts which are assembled into one part, this facilitates assembly of the safety switch 1. The second slidable button portion 9 comprises a cavity 12, wherein the protrusion 11 of the first slidable button portion 8 protrudes and is arranged to mesh.

The sub button arrangement 4 comprises a biasing means 13. The biasing means 13 is arranged on a guiding pin 14 provided on the second slidable button portion 9. The guiding pin 14 extends in a direction substantially perpendicular to an upper surface 15 of the first slidable button portion 8. Further, the guiding pin 14 is arranged in the area between the second slidable button portion 9 and the pivot axle 5. The guiding pin 14 is provided to guide the biasing means 13 during activation of the safety switch 1. This ensures that the biasing means 13 is compressed and extended without departing from its compression direction. In this context, the expansion-compression direction is to be interpreted as the axis forming a central axis in the center of the biasing means 13. The biasing means 13 is arranged to be spring biased between a surface 16 of the main button arrangement 3 and the second slidable button portion 9 of the sub button arrangement 4. Further, the biasing means 13 may be a coil spring, helical spring or any other suitable spring means.

The main button arrangement 3 comprises a first main button portion 17 and a second main button portion 18. The first main button portion 17 is provided above the second main button portion 18. The pivot axle 5 is preferably provided in the second main button portion 18. The second main button portion 18 is provided with a recess 19 into which a projecting portion 20 of the second slidable button portion 9 is guided during activation or deactivation of the safety switch 1. Further, the biasing means 13 and the guiding pin 14 are provided within the projecting portion 20 of the second main button portion 18.

Further, the sub button arrangement 4 comprises a protruding sub button portion 21 which extends toward the housing 2. The protruding sub button portion 21 is provided on the second slidable button portion 9. The housing 2 comprises an abutment portion 22 which extends from the housing 2 toward the safety switch 1 and its second slidable button portion 9. The sub button arrangement 4 is slidably arranged in a longitudinal direction along an upper surface 23 of the main button arrangement 3. The sub button arrangement 4 may preferably be slidable back and forth towards two opposite exterior boundary sides of the housing 2. The sub button arrangement 4 is slidable in a longitudinal direction along a substantially upper surface 23 of the main button arrangement 3.

The first slidable button portion 8 comprises a first protrusion 24 and a second protrusion 25 which extend toward the housing 2. The first and second protrusions 24, 25 are arranged on a lower surface 26 of the first slidable button portion 8 and extend toward the housing 2.

The main button arrangement 3 comprises a first recess 27 and a second recess 28 into which the first and second protrusions 24, 25 protrude. The first and second recesses 27, 28 of the main button arrangement 3 are U-shaped. The first recess 27 comprises a first wall portion 29 and a second wall portion 30, likewise the second recess 28 comprises a third wall portion 31 and a fourth wall portion 32. The wall portions 29, 30, 31, 32 extend toward the first slidable button portion 8. The first recess 27 with its first and second wall portions 29, 30 together with the first protrusion 24 form a labyrinth which prevents debris and dirt from entering into for example the area below the sub button arrangement 4 and causing malfunction of the sub button arrangement 4, such as if debris enters the area where the biasing means 13 is provided. The same applies to the second recess 28 together with the third and fourth wall portions 31, 32 together with the second protrusion. 25. Further, the distance between the first and second wall portions 29, 30 and the third and the fourth wall portions 31, 32, respectively, define the distance the sub button arrangement 4 may move or be slid in relation to the main button arrangement 3.

The main button arrangement comprises a first portion and a second portion, which are separated by means of and in the region of the pivot axis. The sub button portion is provided in the region of the second portion.

The sub button arrangement 4 is slidably arranged and may slide between an arrested position and an activated position. In the arrested position the motor is prevented from being energized and in the activated position the motor may be energized. When the main button arrangement 3 is in the first position, shown in FIGS. 1-3, i.e., the first portion 6 of the main button arrangement 3 has been pivoted around the pivot axle 5 such that the first portion 6 is arranged to slope against the housing 2 and an end portion 33 of the protruding sub button portion 21 abuts and rests against the abutment portion 22 of the housing 2.

FIGS. 4-5, show the main button arrangement 3 in the second position. In the second position the main button arrangement 3 has been pivoted around the pivot axle 5 such that the upper surface 23 of the main button arrangement 3 extends in a direction which is substantially parallel with the longitudinal direction of the housing 2 within the area wherein the safety switch 1 is arranged. Thus, in the second position the protruding sub button portion 21 does not abut and rest against the end portion 33 of the abutment portion 22 of the housing 2. Instead, a side portion 34 of the protruding sub button portion 21 is arranged to abut against a side portion 35 of the abutment portion 22 of the housing 2. Preferably, in the second position the biasing means 13 applies a biasing force against the abutment portion 22 to retain the safety switch 1 in the energize position (in the second position).

In the first position of the main button arrangement 3, the biasing means 13 is arranged to bias the sub button arrangement 4 towards the arrested position. In the arrested position the biasing means 13 is in its most stretched condition. Thus, in the second position, the biasing means 13 is compressed and arranged to bias the sub button arrangement 4 towards the energize position.

The safety switch 1 is in a deactivated state when the main button arrangement 3 is in the first position, i.e., the first portion of the main button arrangement 3 is pivoted around the pivot axle 5 and pushed towards the housing 2. Thus, the first portion is pointing at and sloping towards the housing 2.

Before activation of the safety switch 1, first the safety switch 1 is put into a start position, i.e., in the first position as shown in FIGS. 1-3. In the first position the sub button arrangement 4 is arranged in the arrest position.

During activation, the safety switch 1 is transferred from the arrest position to the energize position. Thus, when the main button arrangement 3 is in the first position, an external force is applied to the sub button arrangement 4 and the sub button arrangement 4 may be moved towards the biasing force exerted by the biasing means 13 and be slid such that the contact between the protruding sub button portion 21 and the end portion 33 of the abutment portion 22 ceases. The external force is applied onto the first slidable button portion 8, which is slid towards the first portion 6 of the main button arrangement 3 such that a gap 36 between the second slidable button portion 9 and the first portion 6 is reduced. Thereafter the safety switch 1 is pivoted around the pivot axle 5, without interruption of the external force applied to the sub button arrangement 4, such that the second portion 7 is pivoted towards the housing. Thus, the safety switch 1 has come into the energize position and the external force applied to the sub button arrangement 4 may be removed. When the external force is removed from the sub button arrangement 4, the biasing means 13 is extended and the sub button arrangement 4 is moved away from the first portion 6. In the energize position the side portion 34 of the protruding sub button portion 21 is arranged to abut against the side portion 35 of the abutment portion 22 of the housing 2. Thus, a biasing force is applied between the side portion 34 of the protruding sub button portion 21 and the side portion 35 of the abutment portion 22 by means of the biasing means 13. In this position the main button arrangement 3 may activate the power means to start and energize the motor.

During deenergizing or shutting off of the motor, the first portion 6 of the main button arrangement 3 is pushed and tilted around the pivot axle 5 towards the housing 2. The power means is deactivated and the motor is stopped, this since the end portion 33 of protruding sub button portion 21 will come into abutment with the abutment portion 22 in the arrested position.

According to the description above, to be able to energize the motor two different motions have to be performed, which avoids unintentional starting or energizing of the gardening device. Thus, first the sub button arrangement 4 is subjected to a sliding motion, where after the main button arrangement 3 together with the sub button arrangement 4 is subjected to a pivoting motion around the pivot axle 5. Thus, the safety switch 1 may be considered as a dead man's grip arrangement which demands two sequential activities to be performed to be able to start the gardening device.

The safety switch 1 may be applied to a robotic lawnmower or a power lawn mower or any other suitable gardening device.

For energizing the gardening device by means of the safety switch 1, the main button arrangement 3 may be pivoted around the pivot axis 5 between a first position and a second position, and the sub button arrangement 4 may be slid between an arrest position and an energize position.

Further, a method may comprise the steps:
pivoting the main button arrangement 3 to the first position, by pushing the first portion 6 towards the housing 2,
application of an external force to the sub button arrangement 4 to overcome the biasing force exerted by the biasing means 13,
sliding the sub button arrangement 4 from the arrest position to the energize position,
maintaining the external force onto the sub button arrangement 4 while pivoting the main button arrangement 3 around the pivot axle 5 to the second position, and
energizing the motor by activation of the power means.

The invention claimed is:
1. A safety switch comprising:
a main button arrangement,
a sub button arrangement which is provided on the main button arrangement, and
a pivot axis around which the main button arrangement is pivotable between a first position and a second position,
wherein the sub button arrangement is slidably arranged, such that when the main button arrangement is in the first position the sub button arrangement is in an arrest position and when the main button arrangement is in the second position the sub button arrangement is in an energize position, and
wherein the sub button arrangement comprises a biasing element that biases the sub button arrangement towards the arrest position when the main button arrangement is in the first position, and by application of an external force the sub button arrangement is moveable towards a biasing force exerted by the biasing element and slidable into the energize position, in which the main button arrangement is pivotable into the second position and in the second position, the biasing element applies a biasing force to retain the main button arrangement in the second position and the sub button arrangement in the energize position,
wherein the sub button arrangement comprises a first protrusion and a second protrusion which extend toward the main button arrangement,
wherein the main button arrangement comprises a first recess and a second recess which are each U-shaped and with each of the first and second U-shaped recesses opening in the same direction, the first and second protrusions protruding respectively into the first and second recesses, and wherein the first recess comprises a first wall portion and a second wall portion which extend toward the sub button arrangement, and the second recess comprises a third wall portion and a fourth wall portion which extend toward the sub button arrangement.

2. The safety switch according to claim 1, wherein the safety switch is provided on a housing provided with an abutment portion, and wherein the sub button arrangement comprises a protruding sub button portion, which protrudes toward and abuts the abutment portion of the housing in the arrested position.

3. The safety switch according to claim 1, wherein the sub button arrangement further comprises a first slidable button portion which is attached to a second slidable button portion which is spring biased against the main button arrangement by means of the biasing element.

4. The safety switch according to claim 3, wherein the biasing element is provided on a guiding pin which is provided on the second slidable button portion and the guiding pin extends toward the pivot axis.

5. The safety switch according to claim 4, wherein the biasing element of the sub button arrangement is a coil spring which is provided on the guiding pin.

* * * * *